I. N. WOOD.
Hoe.
No. 78,561.　　　　　　　　　　　　Patented June 2, 1868.
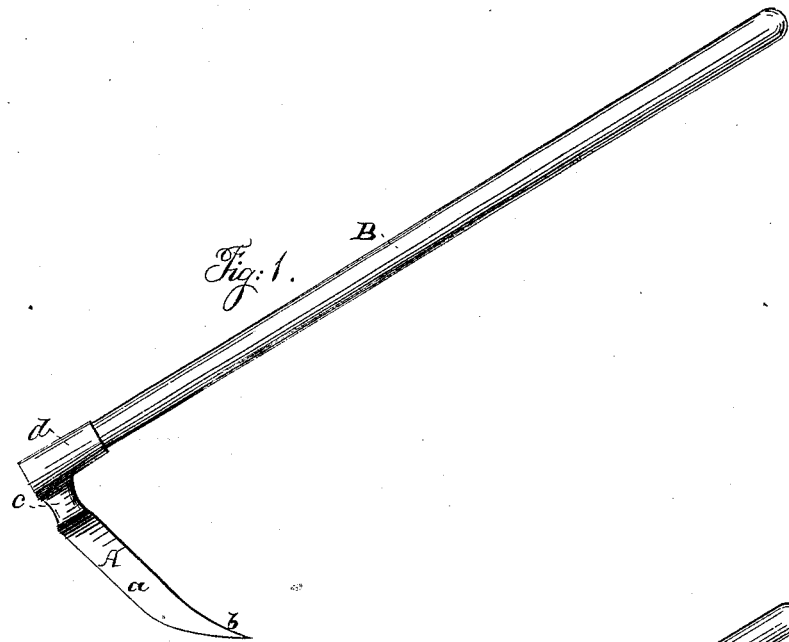
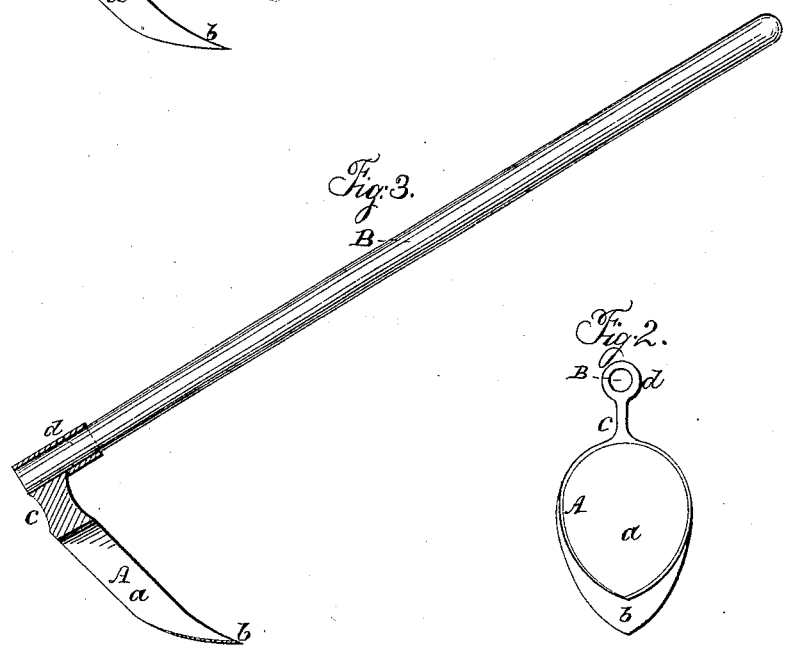
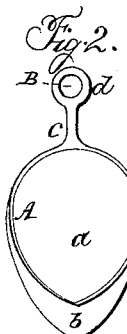
WITNESSES:
J. W. Piper
J. C. Snow
INVENTOR:
Isaac N. Wood.
by his attorney
R. H. Eddy

United States Patent Office.

ISAAC N. WOOD, OF FALL RIVER, MASSACHUSETTS.

Letters Patent No. 78,561, dated June 2, 1868.

IMPROVEMENT IN HOES.

The Schedule referred to in these Letters Patent and making part of the same.

TO ALL PERSONS TO WHOM THESE PRESENTS MAY COME:

Be it known that I, ISAAC N. WOOD, of Fall River, in the county of Bristol, and State of Massachusetts, have invented a new and useful or improved Hoe or implement for digging, weeding, or stirring land; and I do hereby declare the same to be fully described in the following specification, and represented in the accompanying drawings, of which—

Figure 1 is a side elevation,
Figure 2 a front end view, and
Figure 3 a longitudinal section of it.

In such drawings, A denotes the blade, and B the handle of the hoe.

The blade is a short tube, $a$, terminating in or provided at its bottom with an angular front or nose, $b$, and at top with a shank, $c$, having an eye, $d$, to embrace the end of the handle, the whole being shaped in manner as represented in the accompanying drawings.

The inner edges of the tube and nose are sharpened, so as to enable the implement when in use to easily enter the ground.

It is to be used in a manner very similar to that in which a common hoe provided with a solid plate is operated.

The advantage of my improved hoe over the plate-blade hoe is that mine will cut up the weeds and stir the ground without removing the earth or dragging it into ridges, and besides, my hoe, by being open in its blade, can be worked much easier and with less friction than the common hoe.

I claim the improved hoe as made with the short, open, tubular blade, combined or provided with an angular nose, arranged with respect to such blade and its shank, substantially as specified.

ISAAC N. WOOD.

Witnesses:
DAVID SMITH,
RONALD CAMERON.